INVENTOR.

JAMES A. STEWART

United States Patent Office 3,119,186
Patented Jan. 28, 1964

3,119,186
MASON'S LINE ANCHORING DEVICE
James A. Stewart, 2438 Coronette Ave., Dayton 14, Ohio
Filed Jan. 31, 1962, Ser. No. 170,179
2 Claims. (Cl. 33—85)

This invention relates to masonry, and in particular to a tool in the form of a line anchoring device.

It is well known to those experienced in the mason's art, namely in the art of laying concrete blocks, bricks, etc., that a line must be used from time to time to insure the mason that he is laying a true line of blocks or the like and that the wall or whatever he may be constructing will be straight and that no error in alignment will creep into the same as it progresses in height and or length.

It is, therefore, an object of this invention to provide a mason's line anchoring device tht can be used by one man and insure his construction of a straight wall or building.

Another object of this invention is to provide a mason's line anchoring device that can readily be used with any length of line one may desire.

Another object of this invention is to provide a mason's line anchoring device that can readily be used on both concrete blocks and bricks.

Another object of this invention is to provide a mason's line anchoring device that can, in one form, be used for brick veneer construction.

Another object of this invention is to provide a mason's line anchoring device that has but two simple parts, neither of which has any moving parts that require any adjustment.

Another object of this invention is to provide a mason's line anchoring device that can be manufactured from any desired materials such as wood, metal or plastics, or a combiation of any two or three of the aforementioned materials.

Another object of this invention is to provide a mason's line anchoring device that is foolproof in its use and can therefore be used by even the most inexperienced workman.

Still another object of this invention is to provide a mason's line anchoring device that can readily be manufactured and sold at a cost well within the reach of every mason or the like having need for this kind of a tool.

Other and further objects and advantages of this mason's line and anchoring device will be hereinafter described, and the novel features thereof defined in the appended claims.

Referring to the drawing.

Similar reference characters refer to similar parts throughout the several views of the drawing.

Figure 1:
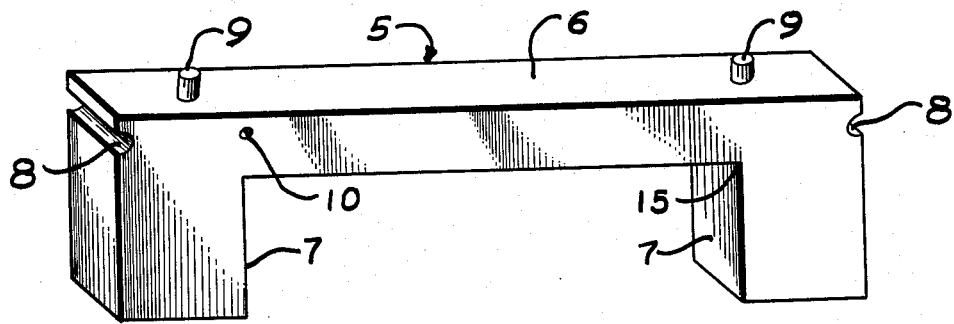
FIGURE 1 is a pictorial view of one of the two identical parts of this invention.

Having reference now to the drawing in detail there is generally indicated by the character 5 a mason's line anchoring device that has the configuration of an inverted U when viewed from the side, the said device embodies a horizontal member 6 terminating at each end in a vertical member 7 at right angle to the aforesaid horizontal member 6. The device has a concave recess 8 in each end thereof extending the entire width of the U shaped member as clearly shown in FIGURE 1 of the appended drawing.

The upper surface of horizontal member 6 is provided with a pair of spaced upright pins 9 that are cylindrical as viewed from the top. The said horizontal member 6 is also provided with a cylindrical opening 10 in the side thereof and parallel to the said concave recess 8.

Figure 2:
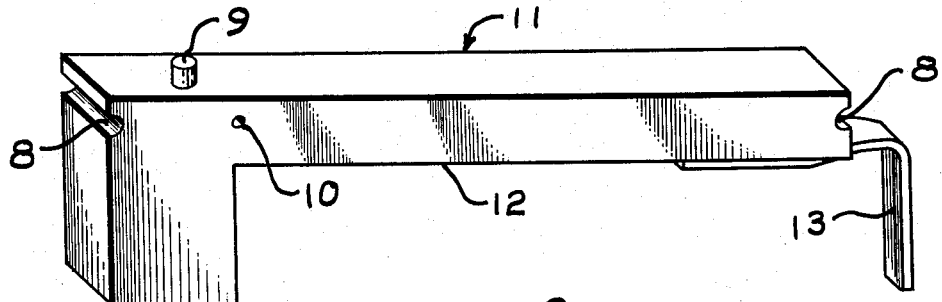
FIGURE 2 is a pictorial view of one of the two identical parts of an optional form of this invention.

In the optional form of this novel invention which is illustrated in FIGURE 2 of the appended drawing, the device 11 is for use on brick veneer construction and consists of an L shaped member 12 having a pair of concave recesses that are identical to those in the previously described form of this invention and are therefore given the same reference character, namely 8. The same thing applies to the upright pin 9 of which there is only one on this optional form and the opening 10. An L shaped strap 13 is secured to the underside of the open end of the aforesaid L shaped member 12 as is clearly shown in FIGURE 2 of the appended drawing.

Figure 3:
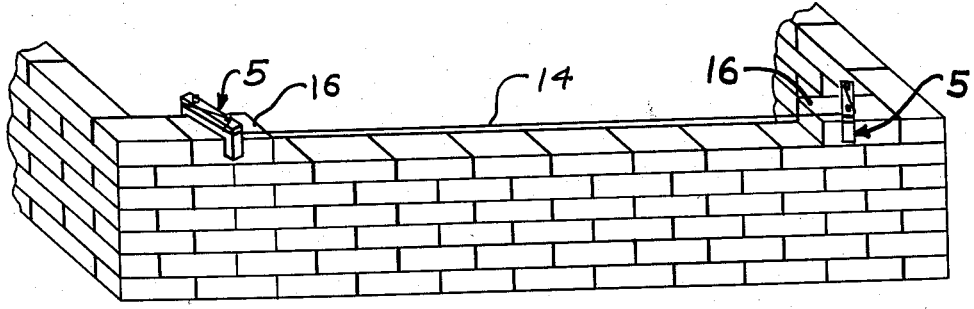
FIGURE 3 is a pictorial view of this invention in use.

The configuration and construction of this novel invention in both the basic form and the optional form, the latter of which is to be used as has already been stated, on brick veneer construction, has now been given in detail and the method of its use will be obvious to anyone experienced in the mason's art, when FIGURE 3 of the appended drawing is examined. However, for the sake of the less experienced masonry workers, a review of exactly how this device is used is given as follows:

A line (chord) 14 is threaded through the cylindrical opening 10 in horizontal member 6 and a knot tied in the end thereof to keep it, the line from slipping back through the opening. The said line is now wound through the concave recesses 8 which serves like a spool to hold approximately forty feet of mason's line. The said line 14 is now unwound from the two devices to any desired length since there are naturally two of them required as one can readily see on examination of FIGURE 3 of the appended drawing. Both of the devices are identical in every respect and have the line secured to the same as above described. After the line 14 has been unwound to its desired length, it, the line, is then put over the upright pins 9 and brought under the cut-out portion of the device at 15. The entire device 5 or 11 depending upon whether it is being used on brick veneer or not, is then placed over the concrete block or its equivalent 16 and the two devices pulled away from each other thus drawing the aforesaid line 14 tight as illustrated by FIGURE 3 of the appended drawings.

From the foregoing it will now be seen that there is herein provided a mason's line anchoring device which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States patent statutes, as stated in the United States Code Title 35, Patents, I have now described the principle of construction and operation of my invention of mason's line anchoring device in the form which I personally consider the best embodiment thereof, and what I now claim as my invention and desire to secure by Letters Patent is:

1. An invention of the character described, comprising two inverted L shaped members each having a concave recess in the leg end thereof and a cylindrical upright pin projecting from the top surface of each said L shaped member, each said leg being provided with a cylindrical opening through the side of the said L shaped member, each said leg near the open end of the L shaped member having a second concave recess in the end thereof opposite that which contains the first mentioned concave recess, the two recesses being parallel to one another, means adjacent the open end of said L shaped member and cooperating therewith for holding the L shaped member in position, a line having its ends passing through the cylindrical opening in each one of the inverted L shaped members, the line having a knot in each end thereof preventing it from being pulled out of each said inverted L shaped member, the said invention being adapted to loosely fit over brick veneer construction thereby providing a check on the true alignment of the same.

2. A mason's line anchoring device, embodying an L shaped member of predetermined width, normally used with the long leg of the said L shaped member in a horizontal position, and an upright pin on the top of the said long leg and over the vertical leg of the said L shaped member, which is provided with a laterally disposed concave recess in each end of the said long leg of the said L shaped member, which has the outer end of the horizontally disposed member of an L shaped strap secured to the underside thereof, the said vertical leg of the said L shaped member, being in parallel spaced relation to the vertical leg of the said L shaped strap, providing a mason's line anchoring device that loosely fits over brick-veneer construction, thereby providing a check on the true horizontal alignment of the said brick-veneer construction.

References Cited in the file of this patent

UNITED STATES PATENTS

| | | |
|---|---|---|
| 2,215,663 | Frisk | Sept. 24, 1940 |
| 2,492,044 | Hulquist | Dec. 20, 1949 |
| 2,505,606 | Coffey | Apr. 25, 1950 |
| 2,508,076 | Palmer | May 16, 1950 |
| 2,523,101 | Edixon | Sept. 19, 1950 |
| 2,659,973 | Patzel | Nov. 24, 1953 |